April 15, 1924.
R. D. PARSONS
1,490,183
MULTIPLE TREAD CUSHION TIRE
Original Filed Jan. 6, 1921
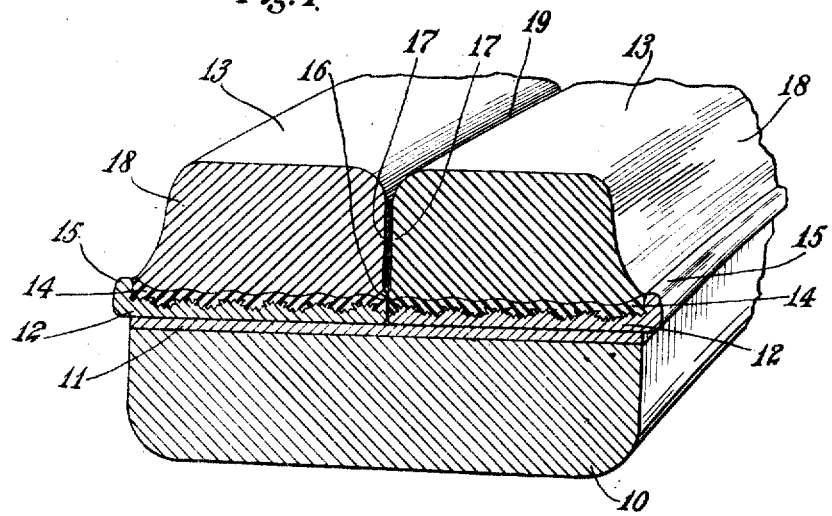
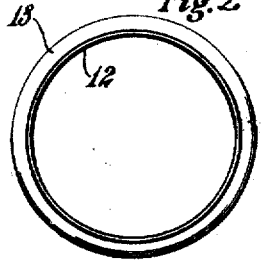
Inventor
Robert D. Parsons
By Robert Nickerson
Atty.

Patented Apr. 15, 1924.

1,490,183

UNITED STATES PATENT OFFICE.

ROBERT D. PARSONS, OF AKRON, OHIO, ASSIGNOR TO THE B, F. GOODRICH COMPANY, OF NEW YORK, N. Y., A CORPORATION OF NEW YORK.

MULTIPLE-TREAD CUSHION TIRE.

Application filed January 6, 1921, Serial No. 435,373. Renewed February 28, 1924.

*To all whom it may concern:*

Be it known that I, ROBERT D. PARSONS, a citizen of the United States, residing at Akron, in the county of Summit and State of Ohio, have invented a certain new and useful Multiple-Tread Cushion Tire, of which the following is a specification.

This invention relates to rubber tires of the solid or cushion type, and its principal object is to provide an improved form of multiple-tread tire.

Of the accompanying drawings:

Fig. 1 is a sectional perspective view showing a portion of a wheel felly on which is mounted a dual-tread cushion tire embodying a preferred form of my invention, the tire being completely divided circumferentially in the middle thereof.

Fig. 2 is a side elevation of the demounted tire.

Referring to the drawings, 10 is the wheel felly and 11 is the usual metal felly-band or fixed rim thereon having a cylindrical outer surface on which the two sections 12, 12 of the tire rim are seated. The tire is annular and continuous as shown in Fig. 2 and in this case is of the pressed-on variety whose rim members are made slightly smaller on their inner peripheries than the outer periphery of the felly-band and are forced onto the latter under heavy pressure and held thereon by friction.

13, 13 are the two sections of the soft-rubber tire body and 14, 14 are the two sections of hard rubber in the form of a layer at the base of the soft-rubber, connecting it with the metal rim, upon which latter the rubber part is vulcanized. The rim sections are shown with the usual dove-tail ribs and grooves for interlocking them with the hard rubber, and at their outer edges they are formed with shallow radial flanges 15, 15 for protecting the outer edges of the hard rubber layer. It has been common to mount identical cushion tire units side-by-side on a single felly to provide dual or triple tired wheels, but this practice has certain disadvantages. If the rims are flanged on both sides, the ratio of load-carrying surface to rim width is relatively small and a very unequal distribution of pressure and wear takes place under certain conditions such as traveling on crowned roads. If they are not flanged, trouble is encountered in the separation of the rubber from the metal rim, or of the hard and soft rubber layers from each other, at the exposed base edges of the tire. These disadvantages have led to the use of wide single-tread tires, but the latter type has some undesirable characteristics such as high power consumption, inferior resiliency and increased development of heat under hard driving.

My present invention overcomes these difficulties. It will be noted in Fig. 1 that while the dual tire is provided with radial rim flanges 15 at its outer edges, so that the hard rubber 14 is protected at these points both by said flanges and by the overlying bodies 13 of soft rubber which substantially meet the flanges in a taper, thereby minimizing the opportunity for separation of the various layers at these outer edges, there are no radial flanges at the abutting inner edges of the rim-sections 12, but the two sections 14 of the hard-rubber layer come together at this point and are overlaid by the shallow base portions of the soft-rubber tire bodies 13 which also come substantially or completely together at 16. Thus the hard rubber layer, and its junction lines with the metal and the soft rubber, which are among the most vulnerable parts of a tire where separation is most difficult to avoid, are in this case completely protected and at the same time the soft-rubber tread or body parts are brought much closer together than where a plurality of double-flanged, identical or similar tires are mounted on a single wheel as heretofore.

The adjacent inner flanks 17 of the soft-rubber body sections 13 I prefer to make substantially radial, and parallel or nearly so, as shown, while the outer flanks 18 have the usual beveled, reverse-curved form, but some latitude of design is allowable in these respects. The tread surfaces may be originally either flat or slightly rounded, and either smooth, as shown, or provided with any suitable non-skid formation as will be understood without special illustration. The cleft 19 between the body sections 13 preferably extends very nearly to the full depth of these soft-rubber members so as to secure the maximum of ventilation and also a higher degree of resiliency than would be obtainable in a single-tread tire of equal width. At the same time, in the form of my invention illustrated in these drawings, I have shown the cleft 19 as being so narrow that the lateral distortion of the body sections 13 under load, as the part of the tire which bears upon the ground, will bring them together and make them mutually supporting. This capability is especially useful where one side of the tire is bearing more than its equal share of the load, as in running on a crowned road or meeting an obstruction, for in that case the overloaded member derives lateral cushioning support from its neighbor which is not obtainable in the ordinary multiple tire composed of double-flanged units. This construction also affords the maximum ratio of load-supporting surface to the tire width consistent with high cushioning properties, good ventilation and wearing qualities in the type of tire under consideration.

My invention is not wholly confined to dual tires but applies to multiple-tread cushion tires broadly.

I claim:

1. A vehicle tire made in a plurality of parallel sections and comprising a plurality of separate, axially aligned and abutted base members flanged at the two outer edges of the tire and unflanged at their abutting edges, hard rubber layers overlying and vulcanized to said base members and substantially abutting at the adjoining faces of the tire sections, and soft-rubber tire bodies vulcanized to said hard-rubber layers and normally spaced-apart throughout the greater part of the depth of their working portions and abutting at the bases of said tire bodies so as to protect the lines of junction of the hard-rubber layers with the base members and the soft-rubber bodies.

2. A vehicle tire comprising a plurality of separate, axially aligned and abutted base members, hard-rubber layers overlying and vulcanized to said base-members, and soft-rubber tire bodies overlying and vulcanized to said hard-rubber layers and normally spaced-apart throughout substantially their entire working portions except at the extreme bases of said tire bodies, where they abut, the spaced-apart portions of the tire bodies lying sufficiently close to each other to abut under load.

3. A dual vehicle tire comprising a plurality of separate, axially aligned and abutted base members formed with rubber-locking projections on their outer faces and with projecting flanges on their outer edges but having no projecting flanges on their abutting edges, hard-rubber layers overlying and vulcanized to said base members, and soft-rubber tire bodies overlying and vulcanized to said hard-rubber layers and normally spaced apart throughout substantially their entire working portions except at the extreme bases of the tire bodies, where they abut.

In witness whereof I have hereunto set my hand this 3d day of January, 1921.

ROBERT D. PARSONS.